United States Patent [19]
Pazdernik et al.

[11] Patent Number: 5,628,614
[45] Date of Patent: May 13, 1997

[54] CONTINUOUS MOTION STACKING APPARATUS AND METHODS

[75] Inventors: Irvan L. Pazdernik, Alexandria; Jeffery L. Lenarz, Garfield, both of Minn.

[73] Assignee: Douglas Machine Limited Liability Company, Alexandria, Minn.

[21] Appl. No.: 405,360

[22] Filed: Mar. 16, 1995

[51] Int. Cl.$^6$ ................................................ B65G 25/00
[52] U.S. Cl. ........................ 414/790.3; 198/430; 198/437; 198/468.01
[58] Field of Search .................. 414/790.3, 794.3, 414/794.7; 198/430, 427, 456, 468.01, 468.8, 740

[56] References Cited

U.S. PATENT DOCUMENTS

| | | |
|---|---|---|
| 1,362,034 | 12/1920 | Olson . |
| 2,941,650 | 6/1960 | Clinton ................................. 198/430 |
| 2,956,381 | 10/1960 | Chauvin et al. . |
| 3,116,822 | 1/1964 | Carus . |
| 3,407,916 | 10/1968 | Engeler . |
| 3,491,901 | 1/1970 | Pearne et al. . |
| 3,700,127 | 10/1972 | Kurk et al. . |
| 4,003,464 | 1/1977 | Zappia ................................. 198/430 |
| 4,081,073 | 3/1978 | Zappia ................................. 198/430 |
| 4,157,137 | 6/1979 | Hardouin ............................. 198/430 |
| 4,290,517 | 9/1981 | Hafferkamp ........................ 198/430 |
| 4,371,076 | 2/1983 | Nakao . |
| 4,440,289 | 4/1984 | Weis ..................................... 198/437 |
| 4,614,473 | 9/1986 | Kwaüka et al. . |
| 4,756,400 | 7/1988 | Funo et al. . |
| 4,765,790 | 8/1988 | Besemann . |
| 5,092,449 | 3/1992 | Bolin et al. ......................... 198/430 |
| 5,186,306 | 2/1993 | Sjöstrand ............................. 198/437 |

OTHER PUBLICATIONS

Dec. 11, 1995 Drawing and description of the concept from cross–over/stacker model M1202 sold by Douglas Machine prior to filing of the present application.
Dec. 8, 1995 Drawing and description of the concept from lane divider model M2397 sold by Douglas Machine prior to filing of the present application.

*Primary Examiner*—Karen B. Merritt
*Assistant Examiner*—Douglas Hess
*Attorney, Agent, or Firm*—Peterson, Wicks, Nemer & Kamrath, P.A.

[57] ABSTRACT

A continuous motion stacking apparatus (10) is disclosed including a positive drive device (14) which places abutting products on a conveyor (12). When the leading series of products is detected to have reached a predetermined position by a sensor (94), the series of products are pushed from the conveyor (12) by a pusher plate (32) which has a first movement component equal to the conveying speed parallel to the conveyor (12) and a second movement component perpendicular to the conveyor (12). The series of products are pushed onto a shelf (30) simultaneously moving perpendicular to the conveyor (12) with the pusher plate (32). When the shelf (30) retracts, the products fall onto a vertically, movable platform (24) or products supported thereon. A guide (34) moves forward at the conveying speed parallel to the conveyor (12) to keep the remaining products on the conveyor (12) and to keep the last product of the series being pushed from the conveyor (12) parallel to the conveyor (12). The pusher plate (32) is raised above the remaining products on the conveyor (12) when it moves back to its initial cycle position. Thus, product is conveyed by the conveyor (12) at a constant speed at all times of operation of the apparatus (10). Product is pushed from the movable platform (24) onto an output conveyor (22) when stacked to the desired height by a further pusher plate (26).

17 Claims, 2 Drawing Sheets

CONTINUOUS MOTION STACKING APPARATUS AND METHODS

BACKGROUND

The present invention generally relates to continuous motion apparatus and methods for handling products, particularly to continuous motion apparatus and methods for moving products, and specifically to continuous motion apparatus and methods for stacking products.

Products are often packaged in cartons in a stacked condition. Typically, products exit the fabrication process in a single lane. To stack the products, one or more products are separated from that single lane and the separated products are moved relative to the single lane to be above (or below) the products in the single lane. The typical manner that such movement is accomplished is that movement of the products is somehow restricted such as by having the products hit a stationary stop, by stopping the conveyor or similar device moving the products, or by both. This is disadvantageous for several reasons. First, stopping or restricting movement of the products reduces the potential throughput of the stacking apparatus. Additionally, extra energy and time are required to accelerate the products to the conveying speed. Further, especially where products are conveyed to engage a mechanical stop, the products are placed under considerable compression which depending upon the product characteristics can cause potential damage thereto, with the lead product(s) which physically abuts the mechanical stop being especially prone to damage as bearing the brunt of absorbing the shock forces.

Thus, a need exists in the field of product handling for providing apparatus and methods with a relatively high throughput. It is then an aim of the present invention to provide a continuous motion apparatus and methods for handling products and especially for stacking products. It is further an aim of the present invention to provide apparatus and methods for handling products where movement of the products is not restricted such as by mechanical stops or even by pressure switches and the like.

SUMMARY

It is thus an object of the present invention and the present invention aims to solve this need and the problems and disadvantages of prior apparatus and methods in the field of product handling, in preferred aspects of the present invention, by providing products conveyed in a single, straight path in an abutting relation and at a constant conveying speed, with the products being conveyed including a leading series of products and a remaining series of products, with the leading series of products including at least one product, and with the leading series of products from the single, straight path of products being conveyed being removed while the products remaining in the single, straight path continue to move at the constant conveying speed in the single, straight path in the abutting relation.

In preferred aspects of the present invention, a pusher plate of a size for abutting with each of the products in the leading series of products is moved including a first movement component parallel to the single, straight path equal to the constant conveying speed and a second movement component perpendicular to the single, straight path from a first position to a second position, with the pusher plate pushing the leading series of products from the single, straight path while moving from the first position to the second position.

In most preferred aspects of the present invention, the pusher plate is reciprocated between the first and second positions, with the pusher plate being raised in a direction perpendicular to the first and second movement components and in a noninterfering relation with the remaining series of products moving at the constant conveying speed as the pusher plate moves from the second position to the first position.

In further aspects of the present invention, the leading series of products are sensed when reaching a predetermined position on the single, straight path without physical contact with the products.

In still further aspects of the present invention, a shelf is movable between first and second positions in a direction perpendicular to the single, straight path, with the shelf receiving the leading series of products being removed from the single, straight path while moving from the first position to the second position, with the shelf sliding from beneath the leading series of products as the shelf moves from the second position to the first position.

Also, in other aspects of the present invention, a guide is reciprocable between a rearward position and a forward position in a direction parallel to the single, straight path, with the guide moving from the rearward position to the forward position at the constant conveying speed, with the guide guiding the remaining series of products to remain in the single, straight path while the leading series of products are being removed from the single, straight path, with the guide further including means for insuring the last product of the leading series of products remains parallel to the single, straight path as the leading series of products are being removed from the single, straight path.

These and further aspects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
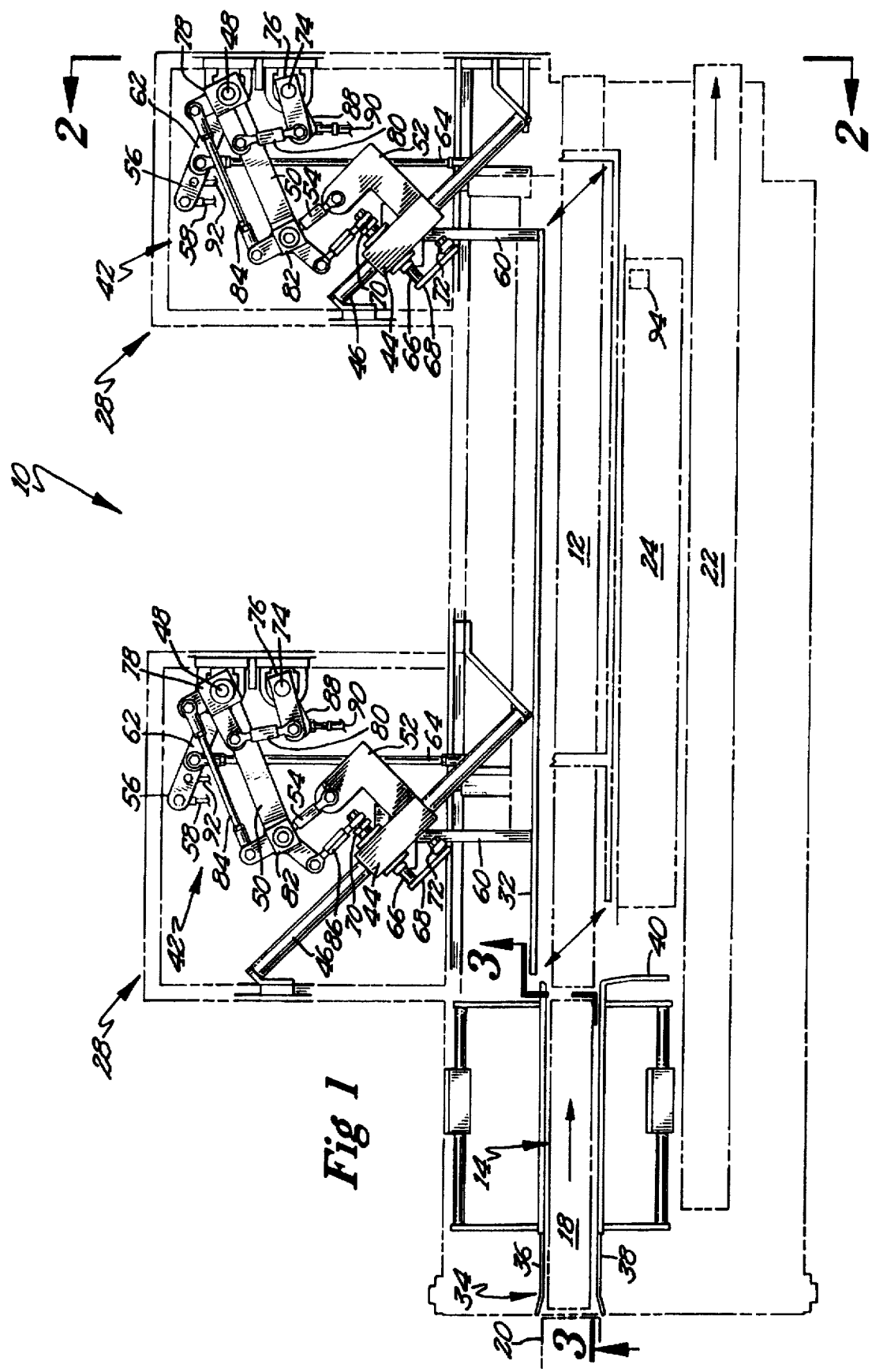
FIG. 1 shows a top plan view of a continuous motion stacking apparatus according to the preferred teachings of the present invention, with portions shown in phantom.
Figure 3:
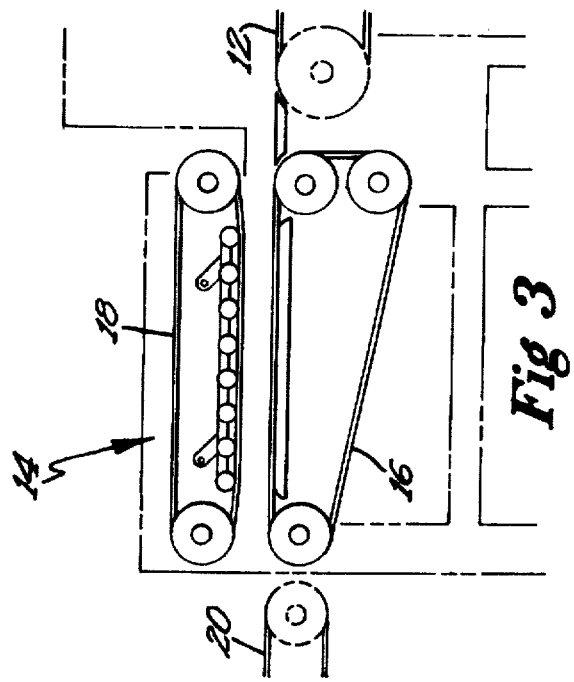
FIG. 3 shows a partial, diagrammatic side elevational view of the continuous motion stacking apparatus of FIG. 1 according to view line 3—3 of FIG. 1.
Figure 2:
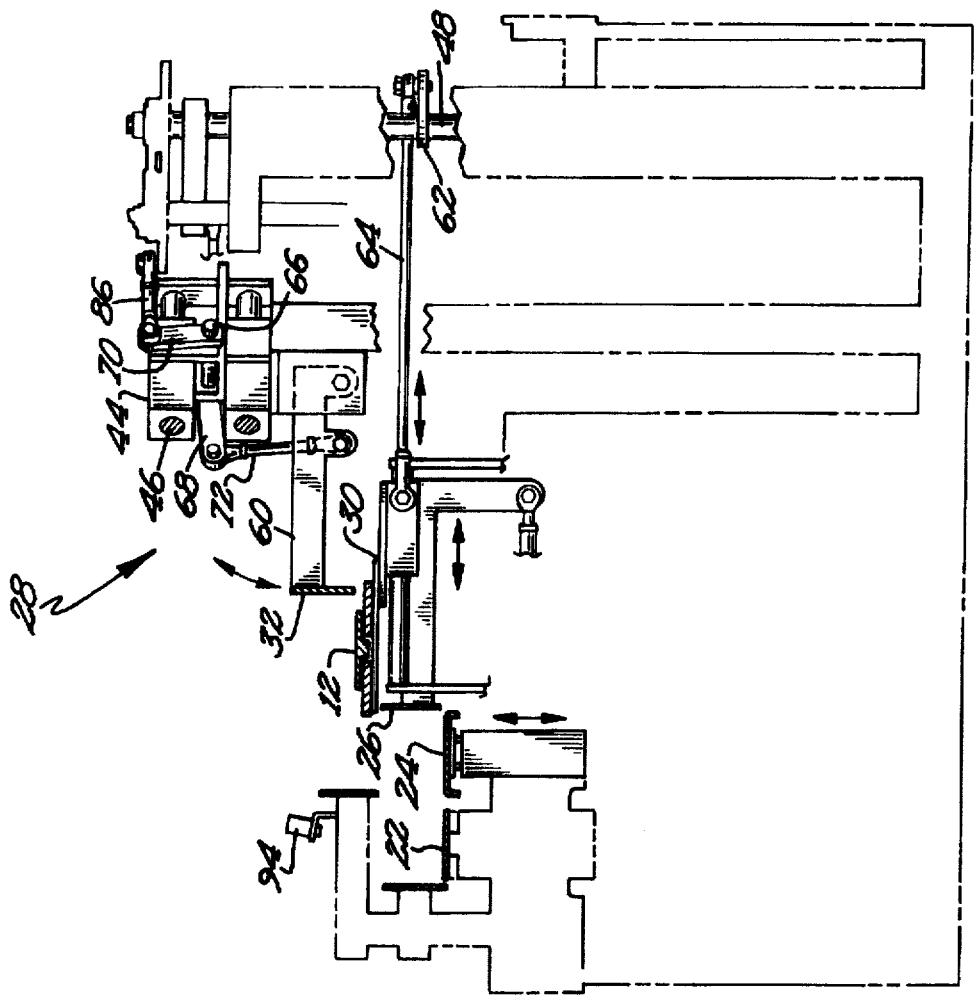
FIG. 2 shows a partially diagrammatic end view of the continuous motion stacking apparatus of FIG. 1 according to view line 2—2 of FIG. 1, with portions shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "end", "side", "horizontal", "vertical", "forward", "rearward", and similar terms are used herein, it should be understood that these terms have reference only to the structure shown in the drawings as it would appear to a person viewing the drawings and are utilized only to facilitate describing the illustrative embodiment.

DESCRIPTION

A continuous motion apparatus for stacking products according to the most preferred teachings of the present invention is shown in the drawings and generally designated 10. Apparatus 10 includes a conveyor 12 for conveying abutting products along a single, generally straight path at a conveying speed. Apparatus 10 further includes a positive drive device 14 for placing product on conveyor 12 in an abutting relation. In the most preferred form, device 14 includes a pair of endless conveyor belts 16 and 18 driven at the same linear speed as conveyor 12. The upper portion of belt 16 is contiguous with the upper portion of conveyor 12 along the generally straight path. The lower portion of belt 18 is parallel to but spaced from the upper portion of belt 16 a distance generally equal to the height of the products to be stacked. Thus, the products are gripped between belts 16 and 18 and are conveyed at the linear speed thereof (which is also equal to the linear speed of conveyor 12) onto conveyor 12. A suitable input conveyor 20 is arranged to position product between belts 16 and 18 along the generally straight path. Conveyor 20 is driven at a linear speed greater than conveyor 12 and device 14. Since the products are gripped by device 14 and can not slide between belts 16 and 18, products traveling on conveyor 20 are prevented from traveling at a speed greater than device 14 and conveyor 12 and will tend to bunch together-behind device 14 and removing any spacings therebetween, with conveyor 20 sliding beneath any product slowed or stopped behind device 14. Thus, it is insured that the products are always in an abutting relation upon conveyor 12. In this regard, suitable means can be provided to insure that sufficient number of products exists on conveyor 20 to keep products in an abutting relation in device 14 such as an electric eye which detects products on conveyor 20 and which activates electronic controls to stop device 14 and conveyor 12 in the event that a minimum number of products are not bunched up behind device 14.

Apparatus 10 further includes an output conveyor 22 parallel to conveyor 12 and horizontally spaced in a direction perpendicular to the generally straight path a distance at least equal to the width of the products to be stacked and vertically spaced in a direction perpendicular to the generally straight path and to the spacing between conveyors 12 and 22 a distance which is a multiple of the height of the products to be stacked. Apparatus 10 further includes a movable platform 24 having a width generally equal to and located in the horizontal spacing between conveyors 12 and 22. Platform 24 is vertically movable between an upper position at a height generally equal to but slightly below the upper portion of conveyor 12 to a lower position at a height generally equal to the upper portion of conveyor 20, with platform 24 being movable from the upper position to the lower position intermittently at spacings generally equal to the height of the products to be stacked.

Apparatus 10 further includes a pusher plate 26 having a lower edge spaced above platform 24 in its lower position less than the height of the products to be stacked and having an upper edge spaced above platform 24 in its lower position generally equal to or less than the height of one product from the combined heights of the stacked products. Pusher plate 26 is movable in a direction parallel to the spacing between conveyors 12 and 22 between an inner position located generally coextensive with the outer edge of conveyor 12 and an outer position located generally coextensive with the inner edge of conveyor 22.

Apparatus 10 according to the preferred teachings of the present invention includes a device 28 for removing a leading series of products from conveyor 12 while the products are traveling at the conveying speed of conveyor 12 and while products continue to be conveyed by conveyor 12 without restriction. In the most preferred form, device 28 generally includes a slideable shelf 30 slideable between a first, inside, home position located generally below conveyor 12 and spaced from conveyor 20 at least equal to the width of the products to be stacked and a second, outside position located vertically above platform 24.

In the most preferred form, device 28 further includes a pusher plate 32 of a size for abutting with each product of a leading series of product for pushing the products from conveyor 12 onto shelf 30 while products are being conveyed by conveyor 12. Plate 32 is movable between a first, inside, home position located generally coextensive with the inner edge of the products on conveyor 12 and a second, outside position located generally coextensive with the outer edge of conveyor 12 and spaced from the inside position in the conveying direction. Plate 32 is also movable between a lower position spaced from conveyor 12 less than the height of the products to be stacked and an upper position spaced from conveyor 12 greater than the height of the products to be stacked. Pusher plate 32 has a length in the conveying direction generally equal to or greater than the length of the series of products desired to be stacked.

In the most preferred form, device 28 further includes a guide 34 including first and second walls 36 and 38 arranged parallel to each other and spaced a distance generally equal to but slightly greater than the width of the products desired to be stacked. Wall 36 is generally coextensive with the inner edge of products on conveyor 12 and of pusher plate 32 in its inside position while wall 38 is generally coextensive with the outer edge of products on conveyor 12 and of pusher plate 32 in its outside position. Wall 38 includes an integral extension 40 at its forward edge extending generally perpendicularly therefrom in a direction towards conveyor 22. Guide 34 is movable between a rearward position and a forward position generally parallel to the straight path, with guide 34 moving from the rearward position to the forward position at a speed generally equal to the conveying speed.

Device 28 further includes a suitable mechanism 42 for simultaneously moving shelf 30 and pusher plate 32 between their inside and outside positions and guide 34 between its rearward and forward positions. In particular, mechanism 42 includes first and second slide blocks 44 slideably mounted upon stationary shafts 46. In the most preferred form, each slide block 44 is movable between inner and outer positions in a slide direction which is at an acute angle to the generally straight path of conveyor 12 and in the most preferred form is in the order of 45° to conveyor 12. Mechanism 42 further includes a suitable device for reciprocating each slide block 44 between its inner and outer positions. Particularly, in the most preferred form, mechanism 42 includes a first rotatably mounted, vertical shaft 48. A first horizontal crank arm 50 is suitably secured to shaft 48. An L-shaped ear 52 is suitably secured to slide block 44. A turnbuckle 54 has its opposite ends pivotably attached to the free ends of arm 50 and ear 52. Shaft 48 is rotated about an arc of an angle substantially smaller than 360° and in the most preferred form about an arc of about 45° by any suitable means such as by a horizontal crank arm 56 secured to shaft 48. The free end of crank arm 56 can be reciprocated such as by a linkage 58 having a first end pivotably attached to the free end of arm 56 and the second end attached to a suitable cam drive or the like. Thus, when crank arm 56 is reciprocated, shaft 48 is rotated and due to its interconnection by arm 50, ear 52, and turnbuckle 54, slide block 44 slides upon shaft 46 between the inner and outer positions.

Pusher plate 32 in the preferred form is pivotably mounted to slide blocks 44 about an axis which is parallel to and spaced from the generally straight path of conveyor 12 and from pusher plate 32. In the most preferred form, pusher plate 32 includes first and second arms 60 integrally extending from the back side of pusher plate 32 opposite to the products on conveyor 12. The free ends of arms 60 are pivotally mounted to the first and second slide blocks 44 about a pivot axis parallel to conveyor 12 and the generally straight path. Thus, as slide blocks 44 are slid between their inner and outer positions, pusher plate 32 moves between its inside and outside positions. It can then be appreciated that due to the non-parallel movement direction of slide blocks 44 on shafts 46, slide blocks 44 and pusher plate 32 mounted thereto have movement components which are parallel to conveyor 12 as well as perpendicular to conveyor 12. The speed of the movement component parallel to conveyor 12 at least when moving from the inside position to the outside position according to the teachings of the present invention is generally equal to the conveying speed of the products upon conveyor 12.

In the most preferred form, a fifth horizontal crank arm 62 is secured to shaft 48. A linkage arm 64 includes a first end pivotally secured to the free end of crank arm 62 and a second end pivotally secured to shelf 30. Thus, when shaft 48 rotates to slide blocks 44 and move pusher plate 32 between its inside and outside positions, shelf 30 is also slid by arms 62 and 64 between its inside and outside positions. In the most preferred form, the speed of movement of shelf 30 from its inside position to its outside position is generally equal to the movement component of pusher plate 32 perpendicular to conveyor 12.

Mechanism 42 further includes a device for moving pusher plate 32 between its upper and lower positions generally perpendicular to the movement components of plate 32 between the inside and outside positions. In the preferred form, a pivot shaft 66 is pivotably mounted in each slide block 44 about an axis which is generally perpendicular to the slide direction of slide block 44. Second and fourth crank arms 68 and 70 are secured generally perpendicular to the opposite ends of pivot shaft 66 and to each other. A turnbuckle 72 includes a first end pivotally secured to the free end of crank arm 68 and a second end pivotally secured to arms 66 spaced from the pivot axis of arms 66 to slide blocks 44. Mechanism 42 further includes a device for pivoting pivot shafts 66 in slide blocks 44. In the most preferred form, mechanism 42 includes a second rotatably mounted, vertical shaft 74. A third horizontal crank arm 76 is suitably secured to shaft 74. A first L-shaped member 78 is pivotably mounted to the upper end of shaft 48, with the ends of the first and second arms of member 78 being radially spaced from shaft 48. A turnbuckle 80 includes a first end pivotally secured to the free end of crank arm 76 and a second end pivotally secured to the free end of the first arm of member 78. A second L-shaped member 82 is pivotably mounted to the free end of crank arm 50 about an axis parallel to the pivot axis of turnbuckle 54, with the ends of the first and second arms of member 82 being radially spaced from its pivot axis. A turnbuckle 84 includes a first end pivotally mounted to the end of the first arm of member 82 and a second end pivotally mounted to the end of the second arm of member 78. Additionally, a turnbuckle 86 includes a first end pivotally mounted to the free end of crank arm 70 and a second end pivotally mounted to the end of the second arm of member 82. Shaft 74 is rotated about an arc of an angle substantially smaller than 360° and in the most preferred form about an arc of an angle of about 15° by any suitable means such as by a horizontal crank arm 88 secured to shaft 74. The free end of crank arm 88 can be reciprocated such as by a linkage 90 having a first end pivotally attached to the free end of arm 88 and the second end attached to a suitable cam drive or the like. Thus, when crank arm 88 is reciprocated, shaft 74 is rotated and due to its interconnection by crank arms 70 and 76, L-shaped members 78 and 82, and turnbuckles 80, 84, and 86, shaft 66 rotates. Rotation of shaft 66 pivots arms 60 and pusher plate 32 between the upper and lower positions due to the interconnection by crank arm 68 and turnbuckle 72.

Mechanism 32 further includes a device for moving guide 34 between the forward and rearward positions, with the speed of movement at least moving from the rearward position to the forward position according to the teachings of the present invention being generally equal to the movement component parallel to conveyor 12 of pusher plate 32 and of the conveying speed of the products upon conveyor 12. In the most preferred form, a linkage 92 is provided having a first end pivotally connected to crank arm 56 (which further defines a sixth crank arm) spaced from shaft 48 and having a second end pivotally connected to a suitable crank arm assembly for moving guide 34.

Apparatus 10 further includes suitable means such as a photoelectric eye sensor 94 for detecting and sensing when the lead product of a series of product reaches a determined position on the straight path when being conveyed by conveyor 12. Sensor 94 provides the necessary input to suitable controls for mechanism 42.

Now that the basic construction of apparatus 10 according to the preferred teachings of the present invention has been explained, the methods according to the teachings of the present invention and at least some of the advantages and features can be set forth and appreciated. For the sake of explanation, it will be assumed that sufficient products are being conveyed on conveyor 20 such that products are bunched up behind device 14. Thus, as products enter device 14, they are in a single lane in an abutting relation. As conveyor 12 operates at the same speed as device 14, products exiting device 14 onto conveyor 12 remain in an abutting relation and are conveyed by conveyor 12 along the single, straight path. When the lead product on conveyor 12 is detected by sensor 94, shaft 48 is suitably rotated to move shelf 30 and pusher plate 32 from their inside to their outside positions and to simultaneously move guide 34 from its rearward to its forward position. It should then be appreciated that since movement of plate 32 and guide 34 in the conveying direction generally equals the conveying speed, movement of the products in device 14 and conveyor 12 is not in any way restricted and specifically the product, device 14, and conveyor 12 are not in any way stopped, with no relative movement occurring between the product and device 14 and/or conveyor 12 and specifically product is not required to slide in device 14 and/or on conveyor 12. Restrictions of movement of the products in the conveying direction can cause compression of the products and especially the first product in the series which can abruptly hit the mechanical stop or similar restriction, with such compression potentially damaging the products.

In this regard, pusher plate 32 and walls 36 and 38 each provide a smooth, planar surface for abutting with the products in device 14 and/or on conveyor 12 and specifically do not include any protuberances or the like which would in any way restrict movement of products. Further, the use of sensor 94 or similar device which does not require physical contact with the products for actuation are advantageous as not providing any restriction to product movement. Specifically, even a pressure switch for abutting with the lead product which would compress the product considerably less than a mechanical stop can place the product under sufficient compression to cause damage to certain products.

It should then be appreciated that when pusher plate 32 moving from the inside to the outside position initially engages the products on conveyor 12, the trailing edge of pusher plate 32 should engage the last product in the series slightly ahead of its trailing edge (which is abutting with the leading edge of the first product in the next series of products), and the leading edges of walls 36 and 38 are slightly behind the leading edge of the first product in the next series of products. It should then be appreciated that since pusher plate 32 and guide 34 move in the conveying direction at the same speed as the products and conveyor 12, pusher plate 32 and guide 34 remain in the same relative position with the products moving on conveyor 12. As the products move with conveyor 12, pusher plate 32 also moves generally perpendicular to conveyor 12 to push the series of products engaged by pusher plate 32 laterally from conveyor 12 as they continue to move longitudinally on conveyor 12. It can then be appreciated that the trailing edge of the last product in the series engaged by pusher plate 32 slides in front of extension 40, with the abutment with extension 40 preventing the last product from rotating or twisting about a vertical axis due to its frictional, abutment with the leading edge of the first product in the next series of products to insure that last product remains parallel to the single, straight path as the leading series of products are being removed from conveyor 12. Likewise, walls 36 and 38 prevent the first product from rotating or twisting about a vertical axis due to its frictional, abutment with the trailing edge of the series of products abutted by pusher plate 32 to insure that the first product of the remaining series of products on conveyor 12 remains in the single, straight path of conveyor 12.

With the simultaneous movement of pusher plate 32 in both the conveying direction and perpendicular to the conveying direction, the products engaged by pusher plate 32 move both longitudinally with the conveyor 12 as well as laterally until they move completely off conveyor 12 when pusher plate 32 reaches its outside position, with the products engaged by pusher plate 32 remaining in a linear, abutting relation parallel to but spaced from conveyor 12.

In the most preferred form, products 12 are pushed from conveyor 12 onto shelf 30 which is moving from its inside position to its outside position simultaneously with the movement of pusher plate 32. Shelf 30 provides a smooth surface for the products to slide on. Since the products have both longitudinal and lateral movement directions as they move off conveyor 12, leading and outside corners may have a tendency to easily abut with any rough surface or protuberances causing the product to somersault or the like as they are pushed from conveyor 12. Such a rough surface could be the upper surface of a prior series of products pushed from conveyor 12.

When pusher plate 32 reaches its outside position, pusher plate 32 is raised from its lower position to its upper position. Further, pusher plate 32 can be moved from its outside position to its home, inside position, with the height of pusher plate 32 above conveyor 12 being sufficient to clear the next series of products on conveyor 12. Simultaneously, guide 34 moves from its forward position to its rearward position, with walls 36 and 38 sliding past the products moving in the conveying direction. Additionally, shelf 30 slides from its outside position to its inside position from underneath the products resting thereon such that the products fall onto movable platform 24 or a prior series of products supported thereon. It should then be appreciated that the products resting on shelf 30 as it slides to its inside position drop only a small fraction of the height of the products in the most preferred form such that the series of products remain in an abutting relation.

After the products drop from shelf 30, platform 24 can be lowered a distance generally equal to the height of the products such that the next series of products which drop from shelf 30 will drop onto the prior series of products. This process can be continued until the products are stacked to the desired height. At which time, if not already there, platform 24 can be lowered to its lowered position. With platform 24 in its lowered position, pusher plate 26 can move from its inner position to its outer position to slide the stacked products from platform 24 onto output conveyor 22. After the stacked products are placed on output conveyor 22, output conveyor 22 can be actuated to convey the stacked products to the next packaging process, not shown. Also, pusher plate 26 can move from its outer position to its inner position and platform 24 raised to its upper position for receiving the next series of products.

When pusher plate 32 is again located in its inside position, pusher plate 32 should also be located in its lowered position such that the cycle can be repeated when the lead product on conveyor 12 is detected by sensor 94. It can then be appreciated that since pusher plate 32 is located in its upper position moving from its outside position to its inside position, pusher plate 32 passes over in a noninterfering relation and without abutting products on conveyor 12. Thus, conveyor 12 and device 14 continue to convey products at a constant conveying speed at all times including when products are being pushed from conveyor 12 by pusher plate 32 as well as when pusher plate 32 returns to its start position. Thus, apparatus 10 according to the preferred teachings of the present invention is able to have increased throughputs and does not compress the products during stacking.

It should be appreciated that to change product sizes, the length of pusher plate 32 need not be varied, but only the location of sensor 94 as plate 32 can extend beyond the first product in the leading series of products to be removed without detriment. Thus, apparatus 10 can be easily converted to run varying sizes of products.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Apparatus for handling a multiplicity of products comprising, in combination: means for conveying the products in a single, straight path in an abutting relation, with the products being conveyed including a leading series of products and a remaining series of products, with the leading series of products including at least one product; and means for removing the leading series of products from the single, straight path of products being conveyed while the products remaining in the single, straight path continue to move in the single, straight path including means for sensing the leading series of products when reaching a predetermined position on the single, straight path without physical contact with the products, with the removing means moving the leading series of products in a first movement component parallel to the single straight path and a second movement component perpendicular to the single straight path from a first position to a second position.

2. The apparatus of claim 1 wherein the sensing means comprises a photoelectric eye.

3. The apparatus of claim 1 wherein the removing means further comprises, in combination: a pusher plate of a size for abutting with each of the products in the leading series of products, with the conveying means conveying the products at a conveying speed; and means for moving the pusher plate including the first movement component parallel to the single, straight path generally equal to the conveying speed and the second movement component perpendicular to the single, straight path, with the pusher plate pushing the leading series of products from the single, straight path while moving from the first position to the second position.

4. The apparatus of claim 3 wherein the moving means reciprocates the pusher plate between the first and second positions; and wherein the moving means further comprises, in combination: means for raising the pusher plate in a direction perpendicular to the first and second movement components and in a noninterfering relation with the remaining series of products moving at the conveying speed as the pusher plate moves from the second position to the first position.

5. Apparatus for handling a multiplicity of products comprising, in combination: means for conveying the products in a single, straight path, with the products being conveyed including a leading series of products and a remaining series of products, with the leading series of products including at least one product; and means for removing the leading series of products from the single, straight path of products being conveyed while the products remaining in the single, straight path continue to move in the single, straight path comprising, in combination: a pusher plate of a size for abutting with each of the products in the leading series of products; means for moving the pusher plate including a first movement component parallel to the single, straight path and a second movement component perpendicular to the single, straight path from a first position to a second position, with the pusher plate pushing the leading series of products from the single, straight path while moving from the first position to the second position; means for pivotably mounting the pusher plate about an axis parallel to the single, straight path, with the moving means reciprocating the pusher plate between the first and second positions; and means for pivoting the pusher plate about the axis for raising the pusher plate in a direction perpendicular to the first and second movement components and in a noninterfering relation with the remaining series of products as the pusher plate moves from the second position to the first position.

6. The apparatus of claim 5 wherein the moving means comprises, in combination: a slide block, means for movably mounting the slide block for movement in a slide direction between a first position and a second position, with the pusher plate being pivotably mounted to the slide block about an axis parallel to the single, straight path, and means for reciprocating the slide block between the first and second positions; wherein the reciprocating means comprises, in combination: a first shaft rotatable about an axis perpendicular to the slide direction; a first crank arm secured to and rotatable with the first shaft and having an end at a radial spacing from the axis; means for interconnecting the end of the first crank arm to the slide block; and means for rotating the first shaft about the axis; and wherein the pivoting means comprises, in combination: a pivot shaft pivotably mounted in the slide block about an axis; a second crank arm secured to and rotatable with the pivot shaft and having an end at a radial spacing from the axis of the pivot shaft; means for interconnecting the end of the second crank arm to the pusher plate; and means for rotating the pivot shaft comprising, in combination: a second shaft rotatable about an axis perpendicular to the slide direction; a third crank arm secured to and rotatable with the second shaft and having an end at a radial spacing from the axis of the second shaft; a fourth crank arm secured to and rotatable with the pivot shaft and having an end at a radial spacing from the axis of the pivot shaft; means for interconnecting the ends of the third and fourth crank arms; and means for rotating the second shaft.

7. The apparatus of claim 6 further comprising, in combination: a shelf movable between first and second positions in a direction perpendicular to the single, straight path, with the shelf receiving the leading series of products being removed from the single, straight path while moving from the first position to the second position, with the shelf sliding from beneath the leading series of products as the shelf moves from the second position to the first position; and means for reciprocating the shelf between the first and second positions comprising, in combination: a fifth crank arm secured to and rotatable with the first shaft and having an end at a radial spacing from the axis of the first shaft; and means for interconnecting the end of the fifth crank arm to the shelf.

8. The apparatus of claim 7 further comprising, in combination: a guide reciprocable between a rearward position and a forward position in a direction parallel to the single, straight path, with the guide moving from the rearward position to the forward position at the the products are conveyed by the conveying means, with the guide guiding the remaining series of products to remain in the single, straight path while the leading series of products are being removed from the single, straight path, with the guide further including means for insuring the last product of the leading series of products remains parallel to the single, straight path as the leading series of products are being removed from the single, straight path, with the guide being reciprocated by a sixth crank arm secured to and rotatable with the first shaft and having an end and means interconnecting the guide to the end of the sixth crank arm.

9. Apparatus for handling a multiplicity of products comprising, in combination: means for conveying the products in a single, straight path, with the products being conveyed including a leading series of products and a remaining series of products, with the leading series of products including at least one product; and means for removing the leading series of products from the single, straight path of products being conveyed while the products remaining in the single, straight path continue to move in the single, straight path comprising, in combination: a pusher plate of a size for abutting with each of the products in the leading series of products; a slide block; means for movably mounting the slide block for movement in a slide direction arranged at a nonparallel angle to the single, straight path between a first position and a second position, with the pusher plate being mounted to the slide block, with the pusher plate pushing the leading series of products from the single, straight path while moving from the first position to the second position; means for raising the pusher plate relative to the slide block and in a noninterfering relation with the remaining series of products as the pusher plate moves from the second position to the first position; and means for reciprocating the slide block between the first and second positions.

10. Apparatus for handling a multiplicity of products comprising, in combination: means for conveying the products in a single, straight path, with the products being conveyed including a leading series of products and a remaining series of products, with the leading series of products including at least one product; means for removing the leading series of products from the single, straight path of products being conveyed while the products remaining in the single, straight path continue to move in the single, straight path; and a shelf movable between first and second positions in a direction perpendicular to the single, straight path, with the shelf receiving the leading series of products being removed from the single, straight path while moving from the first position to the second position, with the shelf sliding from beneath the leading series of products as the shelf moves from the second position to the first position; and means for reciprocating the shelf between the first and second positions.

11. Apparatus for handling a multiplicity of products comprising, in combination: means for conveying the products in a single, straight path, with the products being conveyed including a leading series of products and a remaining series of products, with the leading series of products including at least one product; means for removing the leading series of products from the single, straight path of products being conveyed while the products remaining in the single, straight path continue to move in the single, straight path; and a guide reciprocable between a rearward position and a forward position in a direction parallel to the single, straight path, with the guide guiding the remaining series of products to remain in the single, straight path while the leading series of products are being removed from the single, straight path.

12. The apparatus of claim 11 wherein the guide further includes means for insuring the last product of the leading series of products remains parallel to the single, straight path as the leading series of products are being removed from the single, straight path.

13. Method for handling a multiplicity of products comprising the steps of: conveying the products in a single, straight path in an abutting relation, with the products being conveyed including a leading series of products and a remaining series of products, with the leading series of products including at least one product; sensing when the leading series of products reaches a predetermined position on the single, straight path without physical contact with the products; and removing the leading series of products from the single, straight path of products with a first movement component parallel to the single straight path and a second movement component perpendicular to the single straight path from a first position to a second position, while the products remaining in the single, straight path continue to move in the single, straight path.

14. The method of claim 13 wherein the removing step comprises the steps of: providing a pusher plate of a size for abutting with each of the products in the leading series of products, with the conveying step conveying the products at a conveying speed; and moving the pusher plate including the first movement component parallel to the single, straight path equal to the conveying speed and the second movement component perpendicular to the single, straight path, with the pusher plate pushing the leading series of products from the single, straight path while moving from the first position to the second position.

15. The method of claim 14 wherein the moving step comprises the steps of: reciprocating the pusher plate between the first and second positions; and raising the pusher plate in a direction perpendicular to the first and second movement components and in a noninterfering relation with the remaining series of products moving at the conveying speed as the pusher plate moves from the second position to the first position.

16. Method for handling a multiplicity of products comprising the steps of: conveying the products in a single, straight path, with the products being conveyed including a leading series of products and a remaining series of products, with the leading series of products including at least one product; removing the leading series of products from the single, straight path of products being conveyed while the products remaining in the single, straight path continue to move in the single, straight path; and reciprocating a shelf between first and second positions in a direction perpendicular to the single, straight path, with the shelf receiving the leading series of products being removed from the single, straight path while moving from the first position to the second position, with the shelf sliding from beneath the leading series of products as the shelf moves from the second position to the first position.

17. Method for handling a multiplicity of products comprising the steps of: conveying the products in a single, straight path in an abutting relation, with the products being conveyed including a leading series of products and a remaining series of products, with the leading series of products including at least one product; removing the leading series of products from the single, straight path of products being conveyed while the products remaining in the single, straight path continue to move in the single, straight path in the abutting relation; guiding the remaining series of products to remain in the single, straight path with a guide reciprocable between a forward position and a rearward position in a direction parallel to the single straight path, while the leading series of products are being removed from the single, straight path; and insuring the last product of the leading series of products remains parallel to the single, straight path as the leading series of products are being removed from the single, straight path.

* * * * *

UNITED STATES PATENT AND TRADEMARK OFFICE
CERTIFICATE OF CORRECTION

PATENT NO. : 5,628,614

DATED : May 13, 1997

INVENTOR(S) : Irvan L. Pazdernik & Jeffrey L. Lenarz

It is certified that error appears in the above-identified patent and that said Letters Patent is hereby corrected as shown below:

Column 3, line 30, cancel "together-behind" and substitute therefor --together behind--.

Column 10, line 40, cancel "the the" and substitute therefor --the speed the--.

Signed and Sealed this

Twenty-ninth Day of July, 1997

Attest:

BRUCE LEHMAN

*Attesting Officer*     *Commissioner of Patents and Trademarks*